Nov. 13, 1934.   H. G. CAMPSIE   1,980,971
METHOD FOR SYNTHESIS OF VITAMIN D
Filed Feb. 15, 1934   2 Sheets-Sheet 1

INVENTOR:
HAROLD G. CAMPSIE,
By Fred W. Hamin
ATTORNEY.

Nov. 13, 1934.   H. G. CAMPSIE   1,980,971
METHOD FOR SYNTHESIS OF VITAMIN D
Filed Feb. 15, 1934    2 Sheets-Sheet 2
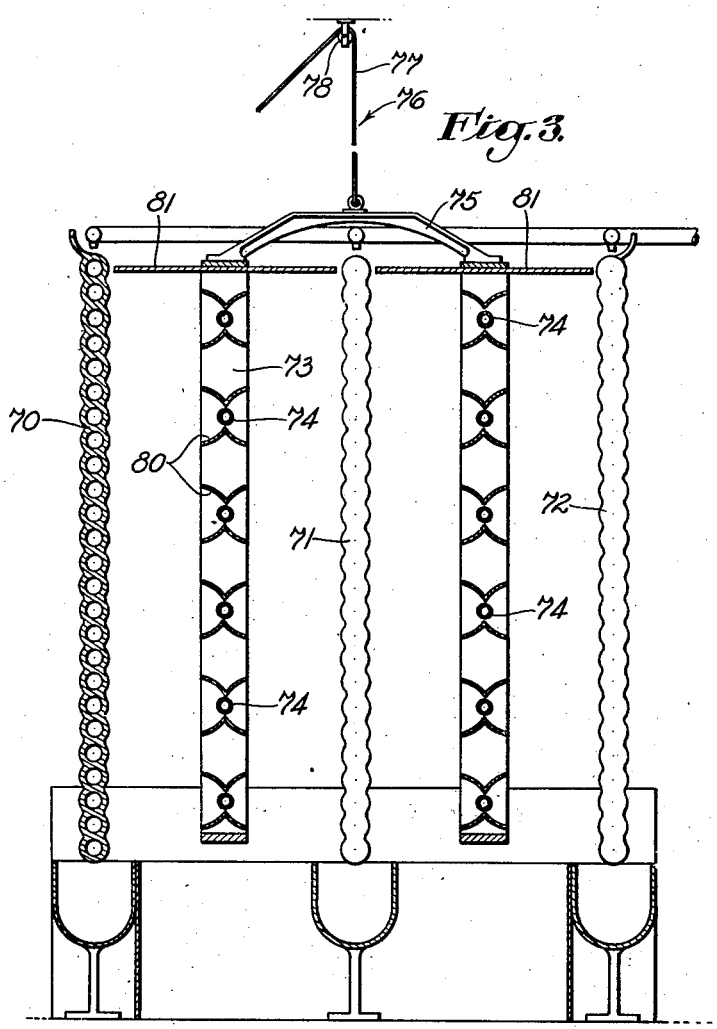
INVENTOR:
HAROLD G. CAMPSIE,
By
ATTORNEY.

Patented Nov. 13, 1934

1,980,971

UNITED STATES PATENT OFFICE 1,980,971

METHOD FOR SYNTHESIS OF VITAMIN D

Harold G. Campsie, Hollywood, Calif.

Application February 15, 1934, Serial No. 711,439

7 Claims. (Cl. 99—11)

My invention relates to the irradiation of liquids and solids containing a pro-vitamin capable of being converted into the anti-rachitic factor by ultra-violet rays for the purpose of producing certain changes in constituent elements of the substance, and is of especial utility in the irradiation of food substances, milk, for example, for producing changes therein or supplementing the qualities of known characteristics thereof.

My present invention is of particular interest by reason of the fact that I produce results superior to those produced by present methods by the use of practices which have been heretofore condemned as detrimental by those versed in the art to which my present invention relates. Contrary to this condemnation, I employ these practices in such a manner that a much greater synthesis is obtained at a cost less than that of the treatment heretofore employed for the same purpose, and I avoid many of the disadvantages encountered in the present modes of treatment. The vitamin characteristics of food products have been benefited or increased by subjecting the products to ultra-violet radiations within certain specified ranges.

I have found that the rate at which light energy can be absorbed by a pro-vitamin material, and consequently the rate at which vitamin D may be developed in such a material, is seven and one-half to ten times as great if such energy be in the form of radiations having a wave length in the band of 2536 to 2540 Angstrom units than if such energy is in the form of radiations of any other wave length. It is therefore an object of my invention to provide a method of developing vitamin D in a pro-vitamin material by contacting such materials with light waves having a wave length in the band 2536 to 2540 Angstrom units.

A carbon arc lamp operates at approximately 5000° F. and a mercury vapor lamp operates at approximately 5000° F. Therefore, both of these lamps radiate a substantial amount of infra-red or red rays which, it is recognized, constitute an impediment to the development of vitamin D by exposure to ultra-violet rays. The cold quartz lamp employed in my process operates at a low temperature and emanates energy about 92 to 96% of which is in the band 2536 to 2540 Angstrom units and none, or a negligible amount, of which is in the infra-red portion of the spectrum. Consequently, employing such emanations in the process of my invention, the development of vitamin D is not impeded by infra-red or red rays. It is an object of my invention to eliminate this great disadvantage by providing a method for developing vitamin D in a pro-vitamin material by radiant energy which includes none or a negligible amount of infra-red or red rays, so that the development of vitamin D is not impeded by the presence of such rays.

The processes available before my invention for developing vitamin D in pro-vitamin materials by irradiation employed either carbon arc or mercury vapor lamps, both of which emanate light rays at a fluctuating rate. Consequently, if either of such lamps is employed to irradiate any pro-vitamin material at a given distance for a given time and produces a definite concentration of vitamin D therein, it is extremely improbable that the same concentration of vitamin D will be secured in exactly the same material irradiated by the same lamp at the same distance for the same time on a subsequent occasion. The determination of the exact concentration of vitamin D for each batch of material irradiated with such processes, therefore, requires a biological test of each batch, requiring approximately thirty days and costing from one hundred to three hundred dollars. This renders the determination of the concentration of vitamin D in materials irradiated by such processes commercially impossible in the case of perishable materials, such as milk, and so costly as to be commercially prohibitive in the case of less perishable materials.

It is an object of my invention to provide a method for developing vitamin D in pro-vitamin materials which will develop in different batches of the same material irradiated on different occasions under the same conditions, exactly the same concentration of vitamin D, so that, this concentration once determined, subsequent assays of the same material irradiated under the same conditions, is unnecessary.

It is another object of my invention to provide a method for developing vitamin D in a pro-vitamin material by irradiation which is much less expensive than the apparatus and methods heretofore available.

I have found that a lamp, commercially available and commercially known as a "cold quartz" lamp, is well adapted for use in the practice of my invention. This lamp consists of a tube of quartz or other material pervious to the band of 2536 to 2540 Angstrom units having an electrode in each end and containing a mixture of xenon, krypton and argon and a few drops of mercury. Approximately ninety-two to ninety-six per cent of the emanations from such a lamp are in the band of from 2536 to 2540 Angstrom units, and none, or a negligible amount, of the emanations are of a wave length of the infra-red portion of the spectrum. The lamp is placed in the circuit with a 110-120 volt alternating current source (e. g., the usual house current) with a regulating choke coil and step-up transformer so that there is provided to the tube approximately 975 volts. When the circuit is closed the lamp, which may be from four to seven feet long and of approximately nine millimeter diameter, operates immediately without tilting of the tube or exciting the electrodes by auxiliary means. The lamp operates at a low temperature, being at a temperature of less than that of the human body even after the lamp has operated as long as one hundred hours, and its electrodes do not become incandescent or even appear to glow. Such a lamp emanates energy at an extremely constant rate throughout its life, which is about thirty thousand hours.

It is therefore still another object of my invention to provide a method for developing vitamin D in a pro-vitamin material by exposing such material to the rays emanating from a cold quartz lamp.

Further objects and advantages of the invention will be made evident throughout the following part of the specification.

Referring to the drawings, which are for illustrative purposes only,

Fig. 3 is a vertically sectioned view showing a form of my invention especially adapted for use in the treatment of milk during the movement of milk over cooling coils subsequent to the pasteurization thereof.

Figure 1:
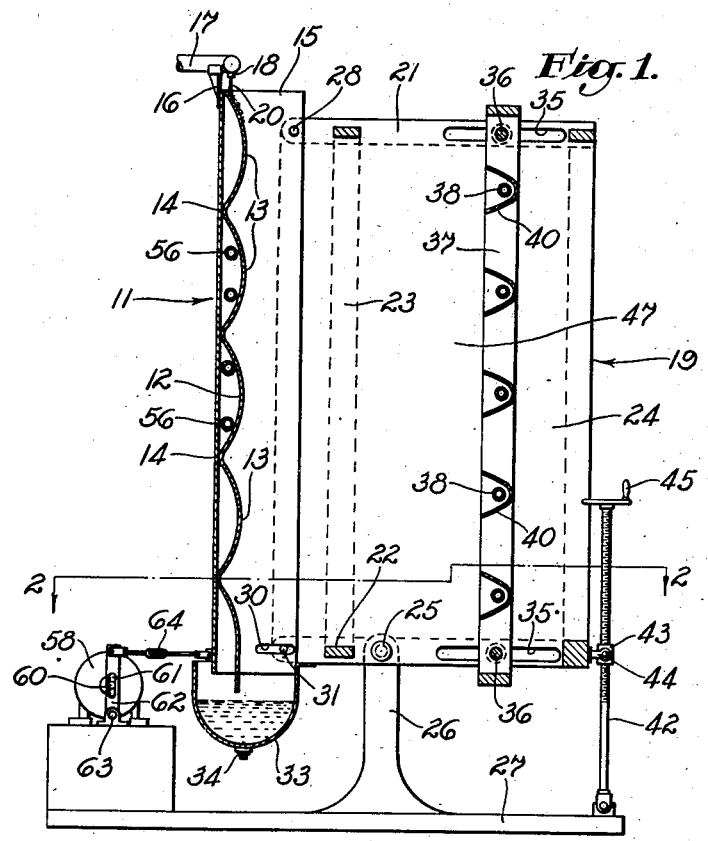
Fig. 1 is a vertical section through a simple form of device for practicing the process of my invention.
Figure 2:
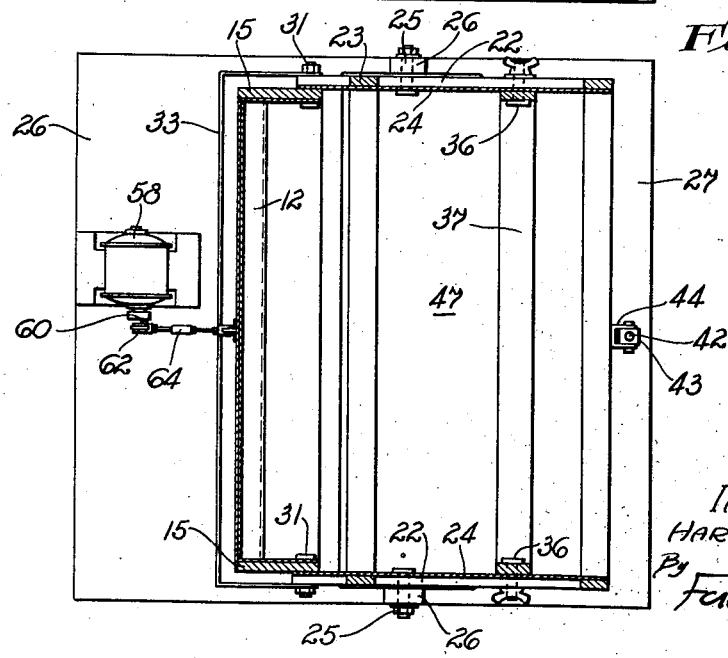
Fig. 2 is a cross-section on a plane represented by the line 2—2 of Fig. 1.

For the sake of illustration, the practice of the invention as applied to milk will be employed to disclose the features and characteristics of my present invention. In the device shown in Figs. 1 and 2, I provide a means 11 for causing a material to be treated to pass through a prescribed path of movement. The means 11 includes a wall member 12, which is of wave form having a series of horizontally directed convex sections 13, the edges of which meet in essentially V-shaped channels 14. The wall member 12 may be supported in a suitable frame structure having side members 15 provided with brackets 16 at the upper edges thereof for carrying a feeder or spreader pipe 17 equipped with a row of openings 18 through which milk is fed onto the rightward surface of the wall member 12, as indicated by the line of flow 20. The member 11 is secured to a tiltable frame structure 19 comprised of upper and lower horizontal members 21 and 22, side members 23, and side walls 24, there being preferably a pair of the members 21 disposed in spaced relation at the upper end of the structure 19, together with a pair of the members 22 spaced apart at the lower end of the frame structure 19 and being mounted upon pivots 25 which define a horizontal axis and are mounted in brackets or arms 26 extending upwardly from a supporting plate 27. The member 11 is pivotally secured to the members 21 of the frame 19 by use of pivot pins or bolts 28, and the lower portions of the members 15 have horizontal slots 30 therein through which pins 31 extend from the leftward ends of the members 22, thereby permitting a limited lateral movement of the lower end of the member 11 around an axis of rotation defined by the pins or bolts 28.

Secured to the members 22 of the frame 19 is a channel-shaped receiver 33 in such position as to receive the fluid which issues from the lower edge of the wall member 12, there being an outlet 34 for the receiver 33 through which the treated material may be conveyed to some suitable disposal or storage. The members 21 and 22 of the frame 19 are provided with slots 35 for receiving bolts 36 which support a radiant frame 37 carrying a plurality of radiants 38. In the preferred practice of the invention, these radiants are cold quartz tubes disposed preferably horizontally, as shown, and having parabolic reflectors 40 adjacent thereto for reflecting the emanations from the tubes 38 in parallelism toward the rightward face of the wall 12 over which the material to be treated moves with a definite rolling action due to the wave form of the wall 12, so as to present all portions of the substance to the emanations from the radiants 38. The frame 37 may be moved in the slides formed by the slots 35 toward and away from the wall 12.

An adjustment means is provided consisting of a screw 42, the lower end of which is connected to the supporting plate 27. This screw 42 threads through a nut 43 swingably secured by means of a bracket 44 to the frame structure 19, so that by rotating the screw 42 through use of a handle 45, the frame structure 19 may be rotated in anti-clockwise direction on the horizontal axis defined by the pivot members 25, whereby to swing the wall member 12 from the essentially vertical position in which it is shown to a position of inclination for the purpose of slowing the speed at which the milk or other substance being treated moves downwardly over the surface of such wall member 12. It is to be noted that the angular adjustment of the device does not change the relation of the radiants to the path of movement of the material being treated, since the frame 19, the frame 37, and the means 11 swing as a unit on the pivot pins 25.

In the treatment of some substances, it may be desired to refrigerate the wall 12, and for this purpose I have shown pipes 56 for carrying brine or other refrigerant in close proximity to the wall 12. A motor 58 is mounted on the leftward end of the supporting plate 27 and has an eccentric crank 60 engaging a slot 61 in an upright arm 62, the lower end of which is pivoted at 63 and the upper end of which is connected through an adjustable link 64 with the member 11. Operation of the motor consequently causes vibration of the member 11 and the wall 12 forming a part thereof. Thus the process of my invention may be practiced upon solid particles being agitated.

The agitation of the solid particles supported on the wall member 12 facilitates their movement along the wall member 12 and also serves to cause different particles to come to the surface and be directly exposed to the activating rays.

At the present time, the value of treating milk for improving the vitamin D character or content thereof may be said to be extensively acknowledged, and some dairies or milk distributing companies are selling milk so treated. It is found that the equipment necessary for this treatment of milk is quite expensive, costly of operation and upkeep, and generally requires the junking of existing equipment. An important feature of my invention is that it may, at a minimum expense, be added to the present equipment of milk handling organizations so that the milk may be treated without the necessity for a burdensome outlay of capital and without great expense of operation and upkeep.

In Fig. 3 I show a plurality of milk coolers 70, 71 and 72, representative of the general type of milk cooler now employed in creameries for quickly cooling milk as the final step of the customary process of pasteurization. These coolers are placed in side-by-side relation with spaces therebetween in which supporting frames 73 may be disposed so as to hold cold quartz tubes 74 in a plane intermediate the adjacent faces of the coolers 70, thereby making it possible to subject the flow of milk across the faces of the coolers 70, 71 and 72 to radiation treatment during the customary cooling operation. The frames 73 are carried by a yoke 75 connected to a lifting means 76 represented by a cable 77 extending over a pulley 78. By this means the frames 73 may be raised from the spaces between the coolers 70, 71 and 72 so that the workman may enter or pass through the spaces in the performance of various duties. Reflectors 80 may be provided, and a horizontal wall 81 may be mounted across the upper ends of the frames 73 for practically closing the upper ends of the spaces between the coolers.

In practicing the process of my invention, I have determined that the distance between the material being treated and the radiant element is of much importance. I have found that air filters out the rays of a wave length of 2536 to 2540 Angstrom units and that this filtration is so substantial if the cold quartz lamp is at a greater distance than five and one-half inches from the material that the activation secured is insufficient in commercial operation. If the cold quartz lamp be placed at a distance from the material to be activated of from two to four inches, it will be found that the loss by filtering is not substantial and space is left between the radiating element and the material being treated. With regard to the distance between radiant element and material being activated, my process is a radical departure from the processes heretofore employed, in which the carbon arc or mercury vapor lamp is at a distance of from twenty-four to thirty inches from the material being treated. At a distance of from twenty-four to thirty inches the cold quartz lamp employed in the practice of my invention will produce only negligible activation of foods because a very great proportion of the activating rays is filtered out. At a distance of five and one-half inches or less, the mercury vapor or carbon arc lamps will produce no appreciable activation without objectionable taste and odor and the rapid destruction of the vitamin D produced.

The cold quartz lamp, having been placed in a position in either apparatus previously described, so that it is from two to four inches from the material to be treated, is retained in this position during successive treatments of different batches of the same material.

The time of exposure of the material to radiations of the radiant element is also of great importance. Exposure of the material for too long a period of time destroys the vitamin D factor produced and renders the material incapable of future activation. This destruction occurs rapidly after the critical time is reached. It is therefore desirable to employ that period of time of exposure which secures the maximum concentration of vitamin D in the irradiated material. This period of time varies with different materials and is apparently directly proportioned to the concentration of the factor available for activation in the material. The optimum time must, therefore, be determined by trial and subsequent test of the vitamin D concentration.

Irradiating milk, for example, with a cold quartz radiating element at a distance of two and one-half inches from the milk, the maximum concentration of vitamin D will be secured in a period of seven to twenty-one seconds, depending upon the percentage of butter fat contained in the milk.

Irradiating yeast in an aqueous solution with the radiating element at the same distance, maximum activation will be secured in from twenty-one to forty-five seconds, dependent upon the concentration of the solution.

Irradiating olive-oil, with the same distance factor, maximum concentration of vitamin D will be secured in from sixty to one hundred and eighty seconds, depending on the opacity and viscosity of the oil.

Irradiating yeast in beer with the lamp at a distance of two and one-half inches, the maximum activation will be reached in from twenty-one to one hundred and twenty seconds, varying with the opacity of the beer.

The foregoing periods of time represent the period of exposure of a quiescent layer of the material given of a thickness equal to the depth of penetration of the radiations of wave lengths in the band of 2536 to 2540 Angstrom units. This depth of penetration varies with the opacity of the material. In milk, the penetration is to a depth of one millimeter. However, it is believed that the vibrations of molecules caused by contact with the rays within the depth of penetration is communicated to other molecules beyond this depth of penetration by molecular contact, so that some activation and resultant development of vitamin D occurs below the depth of such penetration.

In practice, having given the desired rate of flow of the pro-vitamin material along the wall member 12, I determine by trial irradiations of the pro-vitamin material on the wall member 12 and subsequent determinations of the vitamin D concentrations, the optimum period of exposure to a cold quartz lamp at a definite distance, e. g., two inches from the material. I may make these trials on successive irradiations of the same batch of pro-vitamin material. I then design the wall member 12 as to length, width, and angle with the vertical to secure this optimum period. The film of material traveling over the wall member 12 is of a greater thickness than the depth of penetration of the radiations because the tumbling or agitation of the material on the wall member 12 exposes different particles to the radiations during the travel of the material.

Conversely, if the area of the coolers 70, 71 and 72, as illustrated in Fig. 3 is given, I determine the optimum time of exposure by trial of different rates of flow over the coolers and subsequent assay of vitamin D concentration. I then secure this optimum period of exposure by variation of the rate of discharge of the material onto the coolers 70, 71 and 72.

After the desired period of exposure for a given pro-vitamin material and a given design of wall member 12 or cooler 70, 71 or 72 for a given distance between cold quartz lamp and the pro-vitamin material is determined and secured, as above set forth, irradiation is performed on a commercial scale. If these operating conditions are the same for the irradiation of different batches of the same pro-vitamin material on different occasions, exactly the same concentration of vitamin D will be secured. For example, it having been determined that for a given distance of cold quartz lamp from the wall member of given design, a certain rate of flow of milk over that wall member will be activated to 1500 A. D. M. A. units per quart, all succeeding irradiations of other batches of milk of like butter fat content on the apparatus with the lamp at the same distance, and the rate of flow the same, will secure exactly the same concentration of vitamin D, i. e., 1500 A. D. M. A. units per quart and assays of vitamin D concentration of each batch irradiated heretofore required to accurately determine this concentration, are unnecessary.

The irradiation of pro-vitamin materials according to the method hereinbefore described secures a greater activation than it is possible to secure by the apparatus and processes known heretofore. For example, I have found it impossible to secure with the processes of irradiation heretofore commercially available a concentration of vitamin D in milk in excess of 500 A. D. M. A. units per quart without imparting to the milk an objectionable flavor and odor. With the process of my invention, I am able to secure without objectionable flavor or odor in exactly the same kind of milk a vitamin D concentration of 1500 A. D. M. A. units with a 14 second exposure, which is a period of time substantially less than that required by prior commercially known methods to produce the 500 unit per quart concentration.

Similarly, using the processes known commercially heretofore, I was unable to secure by irradiation of yeast in aqueous solution, a concentration of vitamin D in excess of 1200 A. D. M. A. units per gram. This concentration was secured on exposure for three minutes and exposure for a longer period resulted in a decrease in concentration. Using the method of my invention, and irradiating an aqueous solution of exactly the same kind of yeast in exactly the same concentration, I secured in twenty-one seconds a concentration of 3000 A. D. M. A. units per gram.

Moreover, this irradiation by my process was accomplished at a very much lesser cost than the cost of the irradiation by the processes commercially known heretofore. The cold quartz lamp employed in irradiating the yeast solution referred to in the preceding paragraph was of 8 millimeters diameter and about 3 feet length. It was operated at about 975 volts with 50 milliamperes. Consequently, the operating cost of the lamp was only a fraction of the cost of operation of any lamp employed in processes of irradiation heretofore known commercially for producing anywhere near commensurate vitalization.

I claim as my invention:

1. In the art of producing vitamin D in pro-vitamin materials by irradiation, the steps of subjecting said material to the treatment of radiant energy emanating from a radiating element, substantially all of said radiant energy emanating from said radiating element being transmitted to the material by light of a wave length of 2536 to 2540 Angstrom units and substantially free from infra-red rays, causing travel of the pro-vitamin substance relative to the source of radiant energy for the treatment thereof at a distance from the radiating element of not less than two and one-half inches, and varying the rate of travel of the material relative to the source of radiant energy so that the pro-vitamin material is exposed to the ultraviolet light for not more than three minutes whereby substantially none of the vitamin D thus produced is destroyed by too long exposure and no deleterious contamination of the product from the surrounding atmosphere results.

2. The method of treatment of pro-vitamin materials by ultra-violet light to produce therein vitamin D without deleteriously affecting the product, comprising generating ultra-violet light the major portion of whose energy is of wave length 2536 to 2540 Angstrom units and devoid of infra-red rays, placing the pro-vitamin material in air at a distance not greater than about five and one-half inches from the source of said ultra-violet light, exposing said material for a period of time not exceeding approximately three minutes and sufficient to produce the required amount of vitamin D, and quickly moving the treated material away from the light source.

3. The method of treatment of pro-vitamin materials by ultra-violet light to produce therein vitamin D without deleteriously affecting the product, comprising generating ultra-violet light approximately eighty-five percent of whose energy is of wavelength 2536 to 2540 Angstrom units and substantially free from infra-red rays, placing the pro-vitamin material in air at a distance not greater than about five and one-half inches from the source of said ultra-violet light, exposing said material for a period of time not exceeding approximately three minutes and sufficient to produce the required amount of vitamin D, and quickly moving the treated material away from the light source.

4. The method of treatment of pro-vitamin materials by ultra-violet light to produce therein vitamin D without deleteriously affecting the product, comprising generating ultra-violet light the major portion of whose energy is of wave length 2536 to 2540 Angstrom units and substantially free from infra-red rays, placing the pro-vitamin material in air between about two and one-half and five and one half inches from the source of ultra-violet light, exposing said material for a period of time not exceeding approximately three minutes and sufficient to produce the required amount of vitamin D, and quickly moving the treated material away from the light source.

5. The method for treatment of milk by ultra-violet light to produce vitamin D and without producing deleterious products therein, comprising generating ultra-violet light the major portion of whose energy is of wavelengths between 2536 and 2540 Angstrom units substantially devoid of infra-red rays, passing a thin layer of milk at a distance not more than about five and one-half inches from the light source, interposing between the milk layer and the light source a gas which permits the transmission therethrough without substantial loss of intensity of ultra-violet light of wave length between 2536 and 2540 Angstrom units and substantially nullifies the bacteriocidal effect of ultraviolet light of wave lengths less than 2536 Angstrom units, and exposing the milk to the ultra-violet light for a period of time not exceeding twenty-one seconds.

6. The method for treatment of yeast in aqueous solution by ultra-violet light to produce vitamin D and without producing deleterious products therein, comprising generating ultraviolet light the major portion of whose energy is of wave lengths between 2536 and 2540 Angstrom units and substantially devoid of infra-red rays, passing a thin layer of the solution at a distance not more than about five and one-half inches from the light source, interposing between the solution layer and the light source a gas which permits the transmission therethrough without substantial loss of intensity of ultra-violet light of wavelengths between 2536 and 2540 Angstrom units and substantially nullifies the bacteriocidal effect of ultraviolet light of wavelengths less than 2536 Angstrom units, and exposing the liquid for a time not exceeding forty-five seconds.

7. The method for treatment of olive oil by ultra-violet light to produce vitamin D and without producing deleterious products therein, comprising generating ultraviolet light the major portion of whose energy is of wave lengths between 2536 and 2540 Angstrom units and substantially devoid of infra-red rays, passing a thin layer of olive oil at a distance not more than about five and one-half inches from the light source, interposing between the oil layer and the light source a gas which permits the transmission therethrough without substantial loss of intensity of ultraviolet light of wavelengths between 2536 and 2540 Angstrom units and substantially nullifies the bacteriocidal effect of ultra-violet light of wavelengths less than 2536 Angstrom units, and exposing the liquid for a time not exceeding three minutes.

HAROLD G. CAMPSIE.